United States Patent [19]
Bellan et al.

[11] 3,891,745
[45] June 24, 1975

[54] PROCESS FOR PRODUCING BASIC ALUMINUM CHLORIDES

[75] Inventors: Alfred Bellan; Klaus Deneke, both of Luisdorf, Germany

[73] Assignee: Dynamit Nobel AG, Troisdorf, Germany

[22] Filed: Apr. 15, 1974

[21] Appl. No.: 460,868

Related U.S. Application Data

[63] Continuation of Ser. No. 184,221, Sept. 27, 1971, abandoned.

[52] U.S. Cl. ............... 423/462; 423/111; 423/626
[51] Int. Cl. ............................................. C01f 7/56
[58] Field of Search ........... 423/462, 111, 626, 495

[56] References Cited
UNITED STATES PATENTS

| | | | |
|---|---|---|---|
| 1,422,560 | 7/1922 | Gibbs | 423/495 |
| 2,868,623 | 1/1959 | Vittands | 423/494 X |
| 3,476,509 | 11/1969 | Jones | 423/462 |
| 3,535,268 | 10/1970 | Hayes | 423/495 |

FOREIGN PATENTS OR APPLICATIONS

| | | | |
|---|---|---|---|
| 655,617 | 7/1951 | United Kingdom | 423/495 |

Primary Examiner—Edward Stern
Attorney, Agent, or Firm—Burgess, Dinklage & Sprung

[57] ABSTRACT

Basic aluminum chlorides of the formula $Al_2(OH)_{6-n}Cl_n$ wherein $n = 1-5$ are produced by trickling 5 to 15% by weight hydrochloric acid solution down through a fixed bed of aluminum particles of 0.3 to 0.8 kg/liter density and withdrawing a solution of the product having a pH of about 3 to 4. The average residence time of the fluid in passing through the bed is about 2 to 8 hours. Advantageously the lower part of the bed is heated externally to maintain the temperature at about 70° to 95°C to promote continued reaction. Since the reaction is exothermic a reflux condenser may be provided to remove heat resulting from the first contact of hydrochloric acid with aluminum, the condenser allowing by-product hydrogen to escape.

3 Claims, No Drawings

PROCESS FOR PRODUCING BASIC ALUMINUM CHLORIDES

This is a continuation of application Ser. No. 184,221 filed Sept. 27, 1971 now abandoned.

The present invention relates to the production of basic aluminum chlorides.

The basic aluminum chlorides are of industrial importance in the fields of cosmetics and medicine. In less pure form they are also used as binding agents in the production of fireproof mold parts, under certain circumstances with addition of other inorganic compounds.

Various methods are known for making aluminum oxychlorides. Thus, for instance, aluminum hydroxides obtained by precipitation are reacted with acids or acidic solutions of aluminum salts. Another way of obtaining the desired end product is by ion exchange. Another method is based on the double reaction from other basic salts.

In a further process metallic aluminum is used, being reacted with hydrochloric acid in prescribed manner. Operation in this process is batch-wise. Due to the progressive passivation of the metal surface, it is necessary to add mercury salts. The process can, however, be varied by dissolving the aluminum anodically and simultaneously supplying the hydrochloric acid.

All methods according to the state of the art suffer from major drawbacks. Thus, for instance, it is necessary in all cases to prepare intermediate products or carry out corresponding refining operations. In several of the above listed methods the course of the reaction is impeded due to the passivation of the aluminum surface, and complicated additional process steps are necessary. Moreover, all methods have the drawback being discontinuous.

In the light of the great industrial importance of basic aluminum chlorides, as explained above, industry had a genuine need for improving the manufacturing processes of these products and it is accordingly an object of the invention to provide such an improved process.

These and other objects and advantages are realized in accordance with the present invention which relates to a method of making basic aluminum chlorides of the general formula:

$$Al_2(OH)_{6-n}Cl_n,$$

wherein $n$ represents a number between 1 and 5, preferably 1 or 2, in aqueous solution by reacting aluminum with hydrochloric acid characterized in that the aluminum is supplied in the form of shavings, chips, granules or the like, as a fixed bed and hydrochloric acid of 5 to 15% concentration by weight is continuously passed or trickled through this fixed bed. Preferably air is excluded because of the hydrogen which is formed. The temperature of the fixed bed may range from about 20° to 95°C and is preferably at least about 70°C. Aluminum is added to the fixed bed either continuously or intermittently at approximately the same rate it is consumed. The contact time between hydrochloric acid and aluminum is about 2 to 8 hours; by contact time there is meant the average residence time for the fluid portion of the reaction mixture to pass through the fixed bed of aluminum.

Operation under exclusion of air is realized preferably by feeding the hydrochloric acid into the fixed bed at the top and withdrawing the end product via an overflow by means of adjustable height level. Thereby, the entire fixed bed is filled with fluid making it impossible for air to enter. Due to the formation of hydrogen during the reaction, the last traces of air are quickly removed from the apparatus. Basically, it is possible to work as well without the described overflow. In these cases the hydrochloric acid does not flow through the Al bed in the form of a full stream, but rather trickles over the granules. However, under these circumstances, a considerably longer reactor is required because of the reduced contact time between metal and acid. If this mode of operation is employed, the air should at any rate be removed by flushing the apparatus with an inert gas such as nitrogen possibly once or, preferably, continuously. This measure is taken as a precaution against an oxyhydrogen gas explosion.

The aluminum used in the form of shavings, chips, granules or the like should preferably have a bulk density of about 0.3 to 0.8 kg/liter.

In the area where the hydrochloric acid enters the aluminum bed a violent reaction initially takes place, which can be moderated by cooling. The heat can, for instance, be removed by means of technical cooling devices such as watercooled cooling coils or cooling ribs. It is best, however, to work with a reflux condenser which at the same time allows removal of the hydrogen produced during the reaction. Depending on the flow rate of the hydrochloric acid and its concentration it may be necessary to heat specific areas, preferably the discharge area, of the reaction mixture or the fixed bed. Heat is preferably supplied in increasing amount in the direction of flow to maintain the temperature at about 70° to 95°C so as to promote continued reaction. Electric heating is particularly suitable but heating by means of a circulation thermostat using oil as a heat transfer medium is also possible.

The method according to the invention yields an aqueous solution of basic aluminum chlorides having a ph-value between about 3 and 4.

According to the invention it is also possible to place the process under automatic control. Surprisingly, the essential parameters, i.e., contact time, concentration of the hydrochloric acid and heating of the reaction mixture, can be easily regulated both individually and collectively by monitoring the pH-value of the end product.

An example of a unit suitable for carrying out the process according to the invention comprises an upright cylindrical reactor, which is resistant to hydrochloric acid, and which contains an aluminum fixed bed. Hydrochloric acid is supplied to the fixed bed via a conduit by means of a pump. Through the feeding means aluminum is supplied at the same rate that it is consumed. Heat is withdrawn via a reflux condenser which serves at the same time to remove the hydrogen formed during the reaction. The reaction mixture or the fixed bed can be heated by means of an electric heater. The overflow of the end product is realized via an overflow pipe. The filling level of the reactor and, thus, the reaction time is adjustable optionally at a predetermined acid supply by varying the height of an elbow pipe. Entrained metal flakes and other solid impurities settle out in the lower part of the reactor and can be removed from the bottom via a decanting valve.

The reactor is preferably made of glass. Its height and diameter may vary depending on the capacity of the unit and the concentration of the hydrochloric acid. Generally, the ratio of height to inside diameter will range between about 10 : 1 to 30 : 1. In the case of industrial units, the length of the reactor is preferably approximately 4 to 8 m.

The method according to the invention constitutes a technical advance in various respects. Surprisingly, passivation of the aluminum is avoided, which means troublefree operation and the possibility of working continuously. The addition of mercury salts required in the processes according to the state of the art becomes superfluous, nor are expensive operations necessary to isolate intermediate products and to refine the main product. The process is advantageous from the point of view of heat balance and can be easily controlled.

The invention is further described in the following illustrative example. EXAMPLE A reactor contained 75 kg of Al shavings (average shaving size 35 mm) having a packing density of 0.6 kg/liter. By means of a pump per hour 8 liters of 11% by weight hydrochloric acid solution were fed into the reactor continuously via a conduit. At the same time, aluminum shavings were supplied to the reactor via a feed pipe at spaced time intervals of 4 to 8 hours to compensate for the consumption of approximately 1 kg/hr of aluminum. In the upper part of the reactor a violent reaction set in which resulted in the boiling of the hydrochloric acid and reflux via a condenser in addition to the development of hydrogen. As a result of the progressing reaction, more and more hydrochloric acid was consumed in the direction of flow and, in accordance therewith, aluminum salt continued to form at the same time. The progressive dilution of the hydrochloric acid resulted in the reaction being less violent in the lower part of the reactor and the temperature of the reaction mixture slowly decreasing. In order to achieve a sufficiently intensive reaction at this point, heat was supplied by means of an electric heater. Thus, the reaction temperature in the lower reactor region was maintained at about 90°C. The contact time of the fluid reactant was 6.5 hours. From time to time the settled-out residue was removed via a decanting valve.

In a container the end product was collected in the form of a 47% by weight aqueous solution of basic aluminum chloride of the specified general formula wherein $n = 1.4$. The pH-value of this solution was 3.2. The conversion is quantitative based on hydrochloric acid as well as on aluminum, aside from very minor losses via the bottom.

It will be appreciated that the instant specification and examples are set forth by way of illustration and not limitation, and that various modifications and changes may be made without departing from the spirit and scope of the present invention.

What is claimed is:

1. In the process for producing basic aluminum chlorides having the general formula $$Al_2(OH)_{6-n}Cl_n,$$

wherein n represents a number between 1 and 5 by reacting under exclusion of air aluminum with hydrochloric acid, the improvement which comprises continuously passing the hydrochloric acid at a concentration of about 5 to 15% by weight downwardly through an elongated fixed bed of aluminum of a packing density of about 0.3 to 0.8 kg/liter, adding aluminum to the top of said fixed bed at approximately the same rate it is consumed, heating the fixed bed externally progressively to an increasing extent downwardly to maintain the temperature at about 70° to 95°C so as to promote continued reaction, the hydrochloric acid being added at such rate as to establish a contact time of about 2 to 8 hours with the aluminum bed, the concentration of hydrochloric acid, its rate of addition and the extent of external heating being controlled to impart to the resulting solution of end product a pH of about 3 to 4, and withdrawing from the bottom of the bed a solution of the basic aluminum chloride of substantially constant composition.

2. Process according to claim 1 wherein said $n$ is 1 to 2.

3. Process according to claim 1, wherein heat of reaction is removed from the area of initial contact between the hydrochloric acid and aluminum by means of a reflux condenser.

* * * * *

FO-1050
(5/69)

UNITED STATES PATENT OFFICE
CERTIFICATE OF CORRECTION

Patent No. 3,891,745          Dated June 24, 1975

Inventor(s) ALFRED BELLAN and KLAUS DENEKE

It is certified that error appears in the above-identified patent and that said Letters Patent are hereby corrected as shown below:

Page 1 of Patent Deed, after item " [63] " insert

-- [30] FOREIGN APPLICATION PRIORITY DATA

Oct. 1, 1970   Germany......20 48 273.9 --

Signed and Sealed this twenty-eight Day of October 1975

[SEAL]

Attest:

RUTH C. MASON
Attesting Officer

C. MARSHALL DANN
Commissioner of Patents and Trademarks